United States Patent [19]
Nishikawa

[11] Patent Number: 5,208,743
[45] Date of Patent: May 4, 1993

[54] DEVICE AND METHOD FOR GENERATING A SEQUENCE OF INDUSTRIAL PROCESS

[75] Inventor: Hiroshi Nishikawa, Chiba, Japan

[73] Assignee: Sumitomo Chemical Company, Limited, Osaka, Japan

[21] Appl. No.: 635,230

[22] Filed: Dec. 28, 1990

[30] Foreign Application Priority Data

Dec. 28, 1989 [JP] Japan .................................. 1-344281

[51] Int. Cl.$^5$ ........................ G06F 15/46; G05B 11/01
[52] U.S. Cl. ..................................... 364/140; 364/578
[58] Field of Search ............... 364/130, 138, 140, 146, 364/188, 578, 191; 395/650, 152, 155, 168

[56] References Cited

U.S. PATENT DOCUMENTS

| | | | |
|---|---|---|---|
| 4,385,367 | 5/1983 | Nakao et al. | 364/900 |
| 4,447,874 | 5/1984 | Bradley et al. | 395/650 |
| 4,504,900 | 3/1985 | Yomogida et al. | 364/140 |
| 4,628,434 | 12/1986 | Tashiro et al. | 364/130 |
| 4,633,412 | 12/1986 | Ebert, Jr. et al. | 364/493 |
| 4,794,512 | 12/1988 | Toyama et al. | 364/140 |
| 5,055,996 | 10/1991 | Keslowitz | 364/188 |

FOREIGN PATENT DOCUMENTS

| | | |
|---|---|---|
| 0136485 | 4/1985 | European Pat. Off. . |
| 0182382 | 5/1986 | European Pat. Off. . |
| 3401783 | 8/1984 | Fed. Rep. of Germany . |
| 3603142 | 8/1987 | Fed. Rep. of Germany . |
| 59-125403 | 7/1984 | Japan . |
| 62-100806 | 5/1987 | Japan . |

OTHER PUBLICATIONS

Muller, "Leittechnik In Industrieanlangen", Elektronik, No. 22, Nov. 1983.

Primary Examiner—Jerry Smith
Assistant Examiner—Paul Gordon
Attorney, Agent, or Firm—Cushman, Darby & Cushman

[57] ABSTRACT

This invention relates to a system for generating a sequence of an industrial process by combining in a required sequence a plural number of processes each realized by operating an assembly of a plurality of apparatuses (solenoid valve, mixer, flow rate controller, etc.). Operation of the system comprises a first step of storing, in first memory, a sequence command containing apparatus data relating to the apparatuses and operation data relating to the operations of the apparatuses for preparing a command file for realizing the industrial process, a second step of storing in second memory a command file containing the sequence command read from the first memory, which simulates the industrial process and a third step of reading symbols, stored previously by the third memory, which corresponds to the apparatus data of the sequence command stored by the second memory. The operation of the system further comprises a fourth step of displaying a schema of a device for realizing the industrial process using the symbols read in the third step, and a fifth step of reading from the second memory the operation data of the sequence command, and simulating the operational procedure of the industrial process by the device in accordance with the operation data.

13 Claims, 15 Drawing Sheets

Fig. 6

```
*-------------------------------------*
*           R101 RAW MATERIAL CHARGE  *
*-------------------------------------*
*
         TITLE  R 1 0 1  RAW MATERIAL CHARGE
         SEQ    1ST010
*
STRT  NEWS
      SW       1ST010.ON=OFF
      NEWS
      SW       1ST010.ON=ON
*
*              INITIAL CONDITION CHECK
*
RT01  IF       XV102=OPEN,ICHK
      IF       XV103=OPEN,ICHK              |23
      IF       XV301=OPEN,ICHK
      IF       K101=RUN,ICHK
*
*              CHARGE START
*
      OPEN     XV101
RT02  WAIT     XV101=OPEN
      AUT      FIC101                        |24
      CAS      FIC101
      AUT      FQC101
      TIMER    WTIMER1
*
*              INITIAL FLOW RATE CHECK
*
      IF       R101EM-FL=ON,EMRG
      IF       R101PA-FL=ON,PA01
      WAIT     WTIMER1.H1=ON
      NEWS
      IF       PV(FIC101)<?=ON,ABN1
      NEWS
      IF       R101EM-FL=ON,EMRG             |25
      IF       R101PA-FL=ON,PA01
      WAIT     FQC101.END=ON
      MVZ      FIC101
      CLOSE    XV101
RT03  WAIT     XV101=CLOSE
      RUN      K101 (F)
      OG       CHARGE ENDED
      SW       R101EN-FL=ON
      GOTO     STRT
*-------------------------------------*
*              ABNORMAL INITIAL CONDITION
*
ICHK  ANN      INITIAL CONDITION=ON
      SW       R101PA-FL=ON
      IF       R101EM-FL=ON,EMRG             |26
      WAIT     R101PA-FL=OFF
      ANN      INITIAL CONDITION=OFF
      GOTO     RT01
*-------------------------------------*
*              ABNORMAL TEMPERATURE
*
TABN  ANN      TEMPERATURE HI=ON             |27
      GOTO     PA01
*-------------------------------------*
*              ABNORMAL LEVEL
*
LABN  ANN      LEVEL HI=ON                   |28
      GOTO     PA01
*-------------------------------------*
*              ABNORMAL INITIAL FLOW RATE
*
ABN1  ANN      ABNORMAL LINE=ON              |29
      GOTO     PA01
*-------------------------------------*
*              CHARGE INTERRUPTION TREATMENT
*
PA01  OG       INTERRUPTION
      CLOSE    XV101 (F)
      MVZ      FIC101
      CAS      FQC101
      SW       R101PA-FL=ON
      IF       R101EM-FL=ON,EMRG             |30
      WAIT     R101PA-FL=OFF
      IF       FQC101.END=ON,RT03
      OPEN     XV101
      ANN      TEMPERATURE HI=OFF
      ANN      LEVEL HI=OFF
      GOTO     RT02
*-------------------------------------*
*              EMERGENCY STOP TREATMENT
*
EMRG  CLOSE    XV101
      MVZ      FIC101                        |31
      MAN      FQC101
      SW       R101EN-FL=ON
      GOTO     STRT
      END
```

Fig. 9

| ** SEQUENCE TABLE | ** | R 1 0 1 | RAW MATERIAL CHARGE | | | | | | | | | |
|---|---|---|---|---|---|---|---|---|---|---|---|---|
| 1ST010 | | T01.00 | CONDITION SIGNAL NUMBER 32 | | | | OPERATION SIGNAL NUMBER 32 | | | | | |
| | SYMBOL | | | 0000<br>1200<br>-0001<br>12334 | 0000<br>0056<br>56780<br>33344 | 0--2<br>901-<br>9000<br>5556 | 1-1-<br>3400<br>0008<br>7778 | 1-1-<br>7890<br>010-<br>9001 | 2222<br>1234<br>-1-1<br>2222 | 2222<br>5678<br>.... | 2333<br>9012<br>.--2 |
| C001 | **IN01 | | XV102 | .YN. | .N. | | .N. | | | | |
| C002 | **IN02 | | XV103 | .Y.. | YN. | .Y. | YY. | .Y. | | | |
| C003 | **IN03 | | XV301 | .... | .YNN | .Y. | YY. | YY. | | | |
| C004 | **IN04 | | XV101 | .... | .YN. | YN.Y | .Y. | .Y. | | | |
| C005 | **IN05 | | XV101 | | | | | | | | |
| C006 | **IN06 | | R101EM-FL | | | | | | | | |
| C007 | **IN07 | | R101PA-FL | | | | | | | | |
| C008 | **IN08 | | WTIMER1 | | | | | | | | |
| C009 | **IN09 | | PV(FIC101) | | | | | | | | |
| C010 | **IN10 | | FQC101 | | | | | | | | |
| C011 | | | | | | | | | | | |
| C012 | | | | | | | | | | | |
| C013 | | +++++++++++++++++++++++++++++++++++++++++++++++++++++++++++++++++++++ | | | | | | | | | |
| A001 | **OT01 | | 1ST010 | NY.. | .Y. | .N.N | .N.. | .N. | .N.. | | |
| A002 | **OT02 | | XV101 | .... | .Y. | YYY | YY. | YY. | .Y. | | |
| A003 | **OT03 | | WTIMER1 | .... | .YY | .YY | .YY | .YY | .Y. | | |
| A004 | **OT04 | | K101 | .... | | | | | | | |
| A005 | **OT05 | | CHARGE ENDED | | | | | | | | |
| A006 | **OT06 | | R101EN-FL | .YY | .YY | .YY | YY.Y | .YY | .Y. | | |
| A007 | **OT07 | | INITIAL CONDITION | .YY | .YY | .YY | YY.N | .YY | .Y. | | |
| A008 | **OT08 | | R101PA-FL | | | | | | | | |
| A009 | **OT09 | | TEMPERATURE HI | .... | .Y. | .Y. | .Y. | .Y.Y | .N. | | |
| A010 | **OT10 | | LEVEL HI | .... | .Y. | .Y. | .Y. | .Y. | .Y. | | |
| A011 | **OT11 | | ABNORMAL LINE | | | | | | | | |
| A012 | **OT12 | | INTERRUPTION | | | | | | | | |
| A013 | FIC101.MV O | | | | | | | | | | |
| A014 | FIC101.S.AUT | | | | | | | | | | |
| A015 | FIC101.S.CAS | | | | | | | | | | |
| A016 | FQC101.S.AUT | | | | | | | | | | |
| A017 | FQC101.S.CAS | | THEN | 0011 | 1100 | 0101 | 0100 | 0001 | 000. | 000. | |
| A018 | FQC101.S.MAN | | | 2300 | 0045 | 1161 | 1189 | 1132 | 184. | | |
| A019 | | | ELSE | .... | | .0 | .. | .. | .. | .. | |
| A020 | | | | | | .7 | | | | | |
| A021 | | | | | | | | | | | |

Fig. 10G  ★ ABNORMAL LEVEL
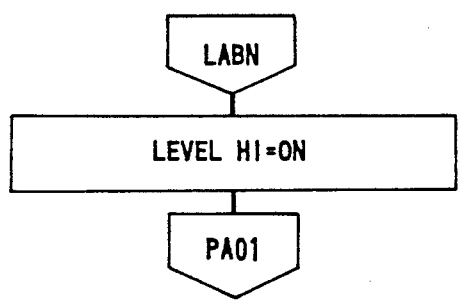
Fig. 10H  ★ ABNORMAL INITIAL FLOW RATE
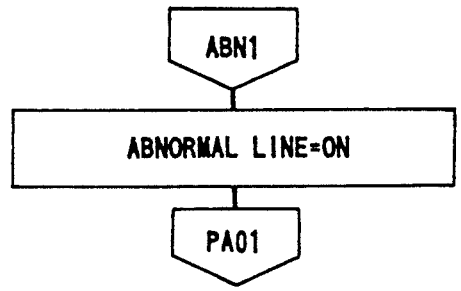

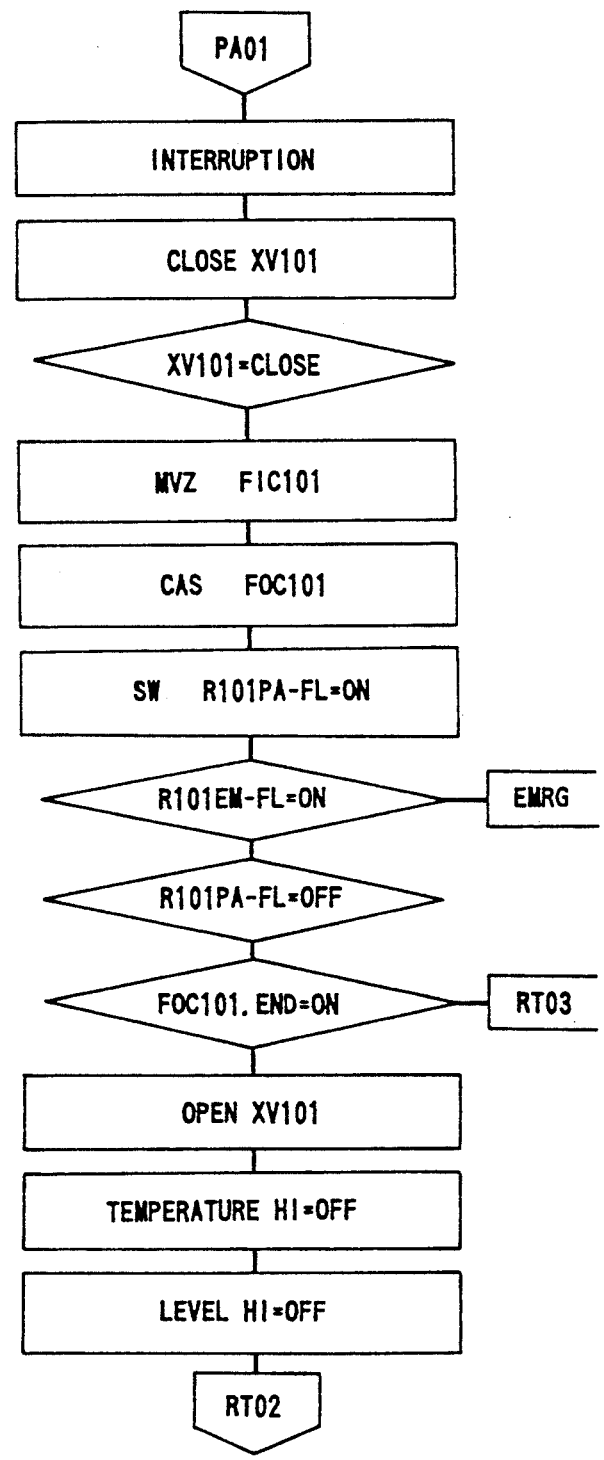
Fig. 101 CHARGE INTERRUPTION TREATMENT

DEVICE AND METHOD FOR GENERATING A SEQUENCE OF INDUSTRIAL PROCESS

BACKGROUND OF THE INVENTION

Field of the Invention

This invention relates to an apparatus and a method for generating a sequence of an industrial process by combining in a set sequence a plural number of processes each constituted by operating an assembly of a plurality of apparatuses in a set manner.

Description of Related Art

DCS (Distributed Control System) is used in industrial processes in which a plural number of processes each constituted by operating in a preset manner an assembly of a plurality of apparatuses with computers are combined in a set sequence, the apparatuses of the industrial process. The case requires sequences, such as table sequences or others, which show the step-by-step operational procedure of the processes. A process for preparing a table sequence for these cases will be explained below.

First, engineers who are familiar with the operational procedure of a process prepare an engineering flow diagram (EFD) or Piping & Instrumentation Diagram (P&ID), and based on this EFD or others, a flow sequence of timing chart is prepared. Then, based on this flow sequence, a table sequence is prepared by the engineers and newly participating engineers who are familiar with apparatuses used in this industrial process. The table sequence shows the operations of the apparatuses of each step along the operational procedure, and usually one process takes hundreds of pages.

To prepare this table sequence, the knowledge of at least operational procedure and the used apparatuses are needed. And different makers have different descriptions of sequence tables. Under the present circumstances where there is a shortage of development and design engineers, a plurality of engineers have to cooperate.

A sequence needs additions and changes. It is inefficient and disturbing to rewrite the associated sequences (flow sequence, table sequence, etc.) every time an addition or a change is made so as to maintain the sequence.

Furthermore, for the same reason as described above, it needs multiple engineers' work to collate some hundred pages of a prepared table sequence.

SUMMARY OF THE INVENTION

An object of this invention is to provide a process for generating a sequence which is applicable to every type of apparatuses, and can generate sequences accurately at high speed.

In order to achieve the above-described object, this invention relates to a system (method, apparatus) for generating a sequence of an industrial process by combining in a required sequence a plural number of processes each realized by operating an assembly of a plurality of apparatuses (solenoid valve, mixer, flow rate controller, etc.), the system comprising the first step of storing in first memory means (such as a flexible disk) a sequence command containing apparatus information of the apparatuses (such as data specifying a solenoid valve) and operation information of the operations of the apparatuses (such as data showing opening and closing a solenoid valve) for preparing a command file for realizing the industrial process; the second step of storing in second memory means (such as RAM) a command file containing the sequence command read from the first memory means in simulating the industrial process; the third step of reading symbols (such as one to discriminate a solenoid valve on display) which have been stored beforehand by the third memory means (such as ROM) corresponding to the apparatus information (such as solenoid valve) of the sequence command stored by the second memory means; the fourth step of displaying a schema of a device for realizing the industrial process, using the symbols read in the third step; and the fifth step of reading from the second memory means the operation information of the sequence command, and simulating the operational procedure of the industrial process by the device, based on the operation information.

Characters corresponding to the sequence command are read from the third memory means, and using these characters, a table sequence of the operational procedure of the industrial process may be generated (displayed on a screen or printed), based on the operation information of the sequence command.

Furthermore, flow elements corresponding to the sequence command are read from the third memory means, and using these flow elements, a flow sequence of the operational procedure of the industrial process may be generated (displayed on a screen or printed).

In the thus-arranged process according to this invention, it is shown how the operations of respective apparatuses involved in an industrial process work in the industrial process.

Furthermore, the operations of the apparatuses involved in the industrial process are shown by tables step by step. In addition, the operational procedure of the industrial process is shown in flowcharts.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a view of one example of the command file in FIG. 4;

FIG. 9 is a view of one example of a table sequence generated by the table generator in FIG. 4; and FIGS. 10A to 10J are views of flow sequences printed by the flowchart printing means in FIG. 4.

DESCRIPTION OF THE PREFERRED EMBODIMENT

Figure 1:
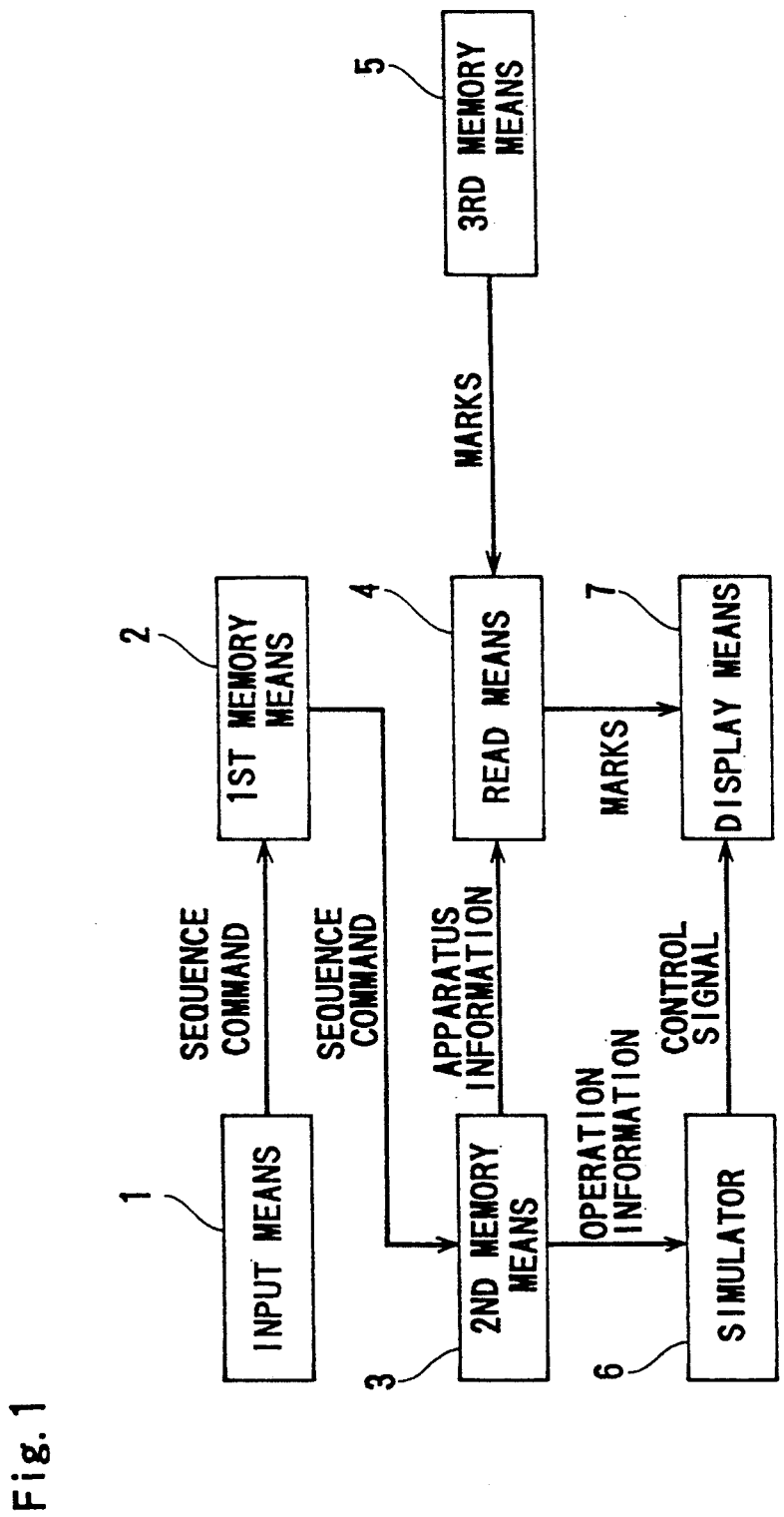
FIG. 1 is a block diagram of a device for realizing the process for generating a sequence of an industrial process according to one embodiment of this invention.

The device for realizing the process for generating a sequence for an industrial process according to embodiments of this invention will be explained with reference to the drawings attached hereto. A common element among the embodiments has the same reference numeral throughout the following description not to repeat its explanation.

This device according to the first embodiment of the present invention as shown in FIG. 1 comprises first input means 1, first memory means 2, second memory means 3, read means 4, third memory means 5, a simulator 6, and display means 7. The input means 1 is provided by a personal computer with a keyboard or the like and the first memory means 2 is connected to the personal computer by Floppy Disk Drive device, so that a sequence command inputted by operating the keyboard is stored by the first memory means 2 in the form of a floppy disk or the like. The second memory means 3 is provided by a RAM or the like and is connected to the first memory means 2, the simulator 6 and the read means 4 so as to allow writing and reading of the sequence command. The apparatus information contained in the sequence command is read by the read means 4 and the operation information is sent to the simulator 6. The read means 4 is connected to the third memory means 5 provided by a ROM, RAM or others and to the display means 7, and reads marks such as signs or symbols corresponding to the apparatus information from the third memory means 5 and supplies the apparatus information to the display means 7. Based on the marks, the display means 7 displays in schema the system apparatuses for realizing the industrial process. The simulator 6 is connected to the second memory means 3 and the display means 7 for obtaining the operation information contained in the sequence command from the second memory means 3 to simulate the system apparatuses on the display screen in accordance with the operational procedure.

Figure 2:
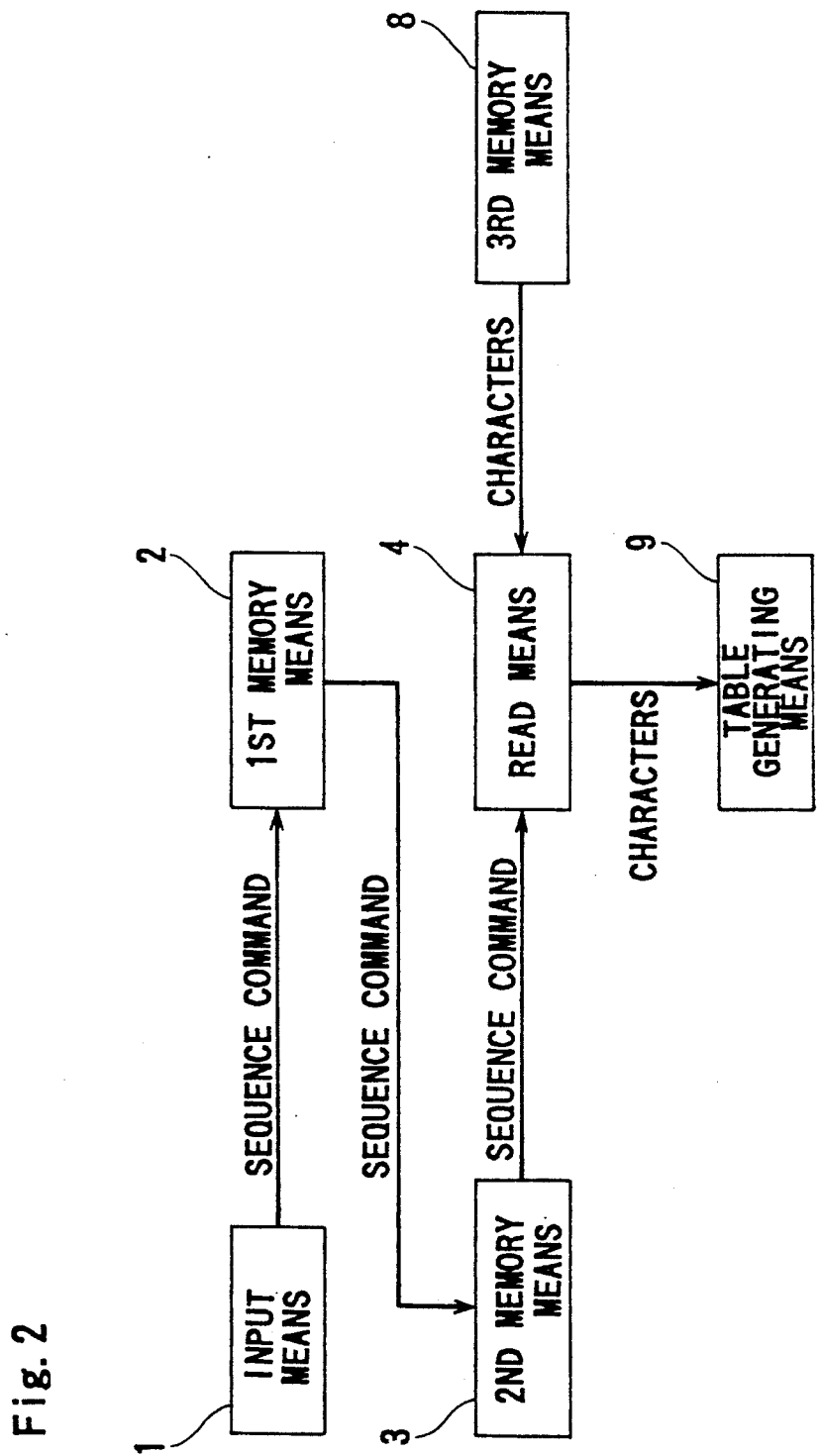
FIG. 2 is a block diagram of a device for realizing the process for generating a sequence (table sequence) of an industrial process according to one embodiment of this invention.

FIG. 2 is a block diagram of the device for generating a sequence including table generating means according to the second embodiment of this invention. This device comprises input means 1, first memory means 2, second memory means 3, read means 4, third memory means 8 and table generating means 9. The input means 1 is provided by a personal computer with a keyboard or the like and first memory means 2 provided by a floppy disk or the like is connected to the personal computer by Floppy Disk Drive device, so that a sequence command inputted by operating the keyboard is stored by the first memory means. The second memory means 3 is provided by, e.g., a RAM is connected to the first memory means 2 and the read means 4 so as to allow writing and reading of the sequence command. The sequence command is read by the read means 4. The read means 4 is connected to the third memory means 8 provided by a ROM, RAM or others and to table generating means 9. The read means 4 reads characters such as letters corresponding to the apparatus information from the third memory means 8 and supplies the information to the table generating means 9. Based on the characters, the table generating means 9 generates a table sequence for the industrial process (displays on the screen or prints the table sequence).

Figure 3:
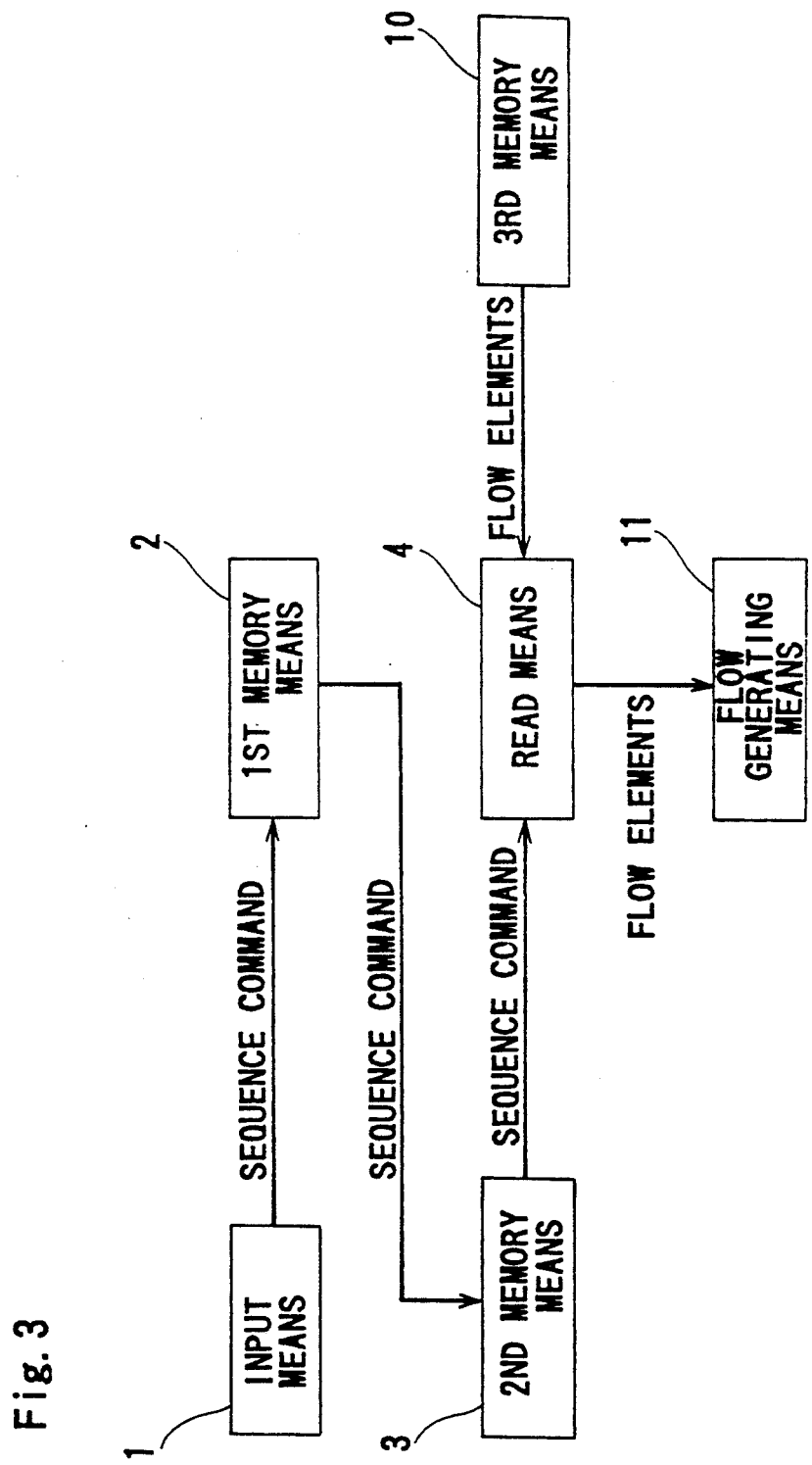
FIG. 3 is a block diagram of a device for realizing the process for generating a sequence (flow sequence) of an industrial process according to one embodiment of this invention.

FIG. 3 is a block diagram of a device for generating a sequence including flow generating means according to the third embodiment of this invention. This device comprises input means 1, first memory means 2, second memory means 3, read means 4, third memory means 10 and flow generating means 11. The input means 1 is provided by a personal computer with a keyboard or the like and the first memory means 2 provided by a floppy disk or the like is connected to the personal computer by Floppy Disk Drive device, so that a sequence command inputted by operating the keyboard is stored by the first memory means 2. The second memory means 3 provided by a RAM or the like is connected to the first memory means 2 and the read means 4, and the sequence command is read by the read means 4. The read means 4 is connected to the third memory means 10 provided by a ROM, RAM or the like, and the flow generating means 11. The read means 4 reads flow elements corresponding to the sequence command from the third memory means 10 and supplies the information to the flow generating means 11.

Figure 4:
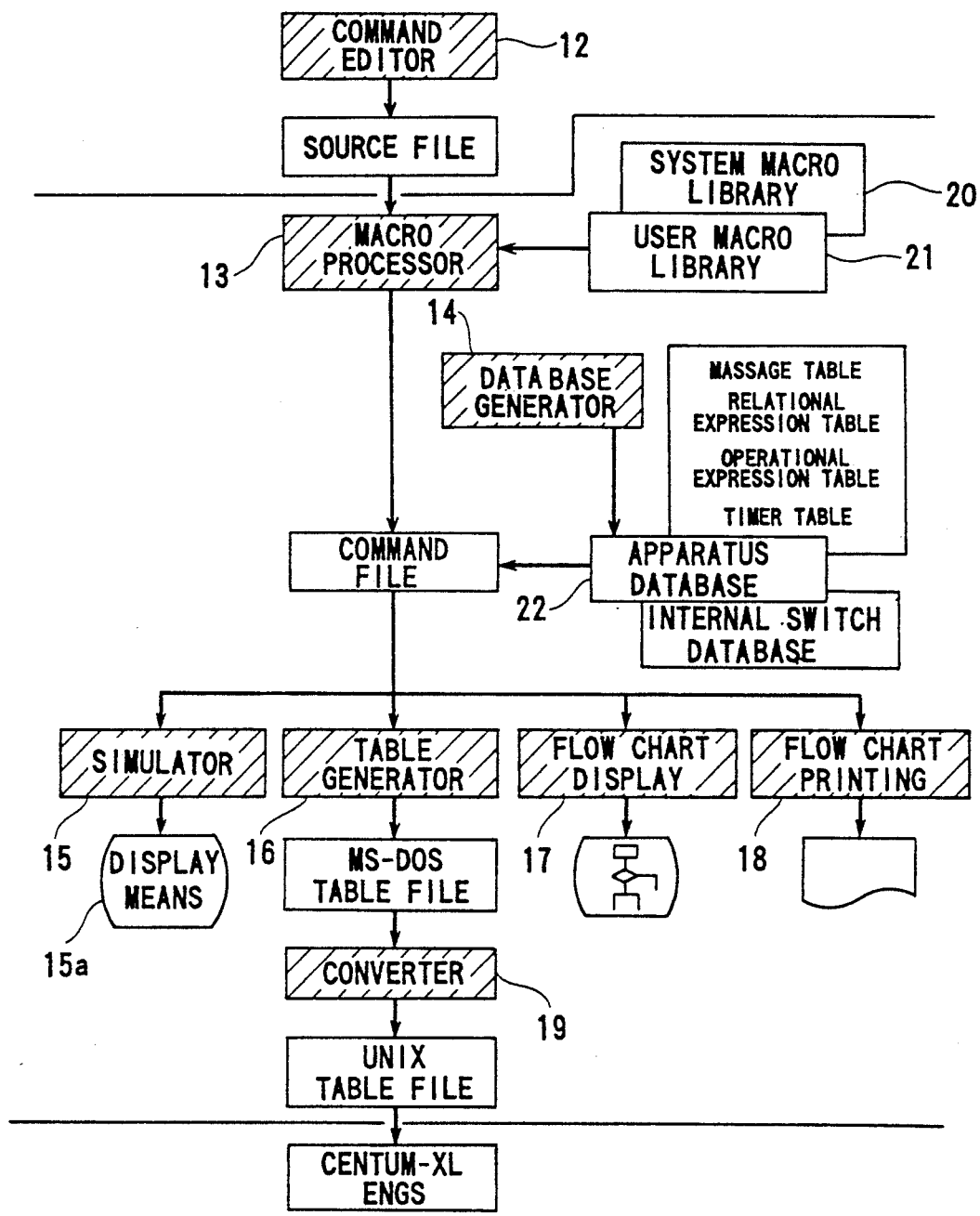
FIG. 4 is a block diagram of a device for realizing the process for generating a sequence of an industrial process according to another embodiment of this invention.
Figure 5:
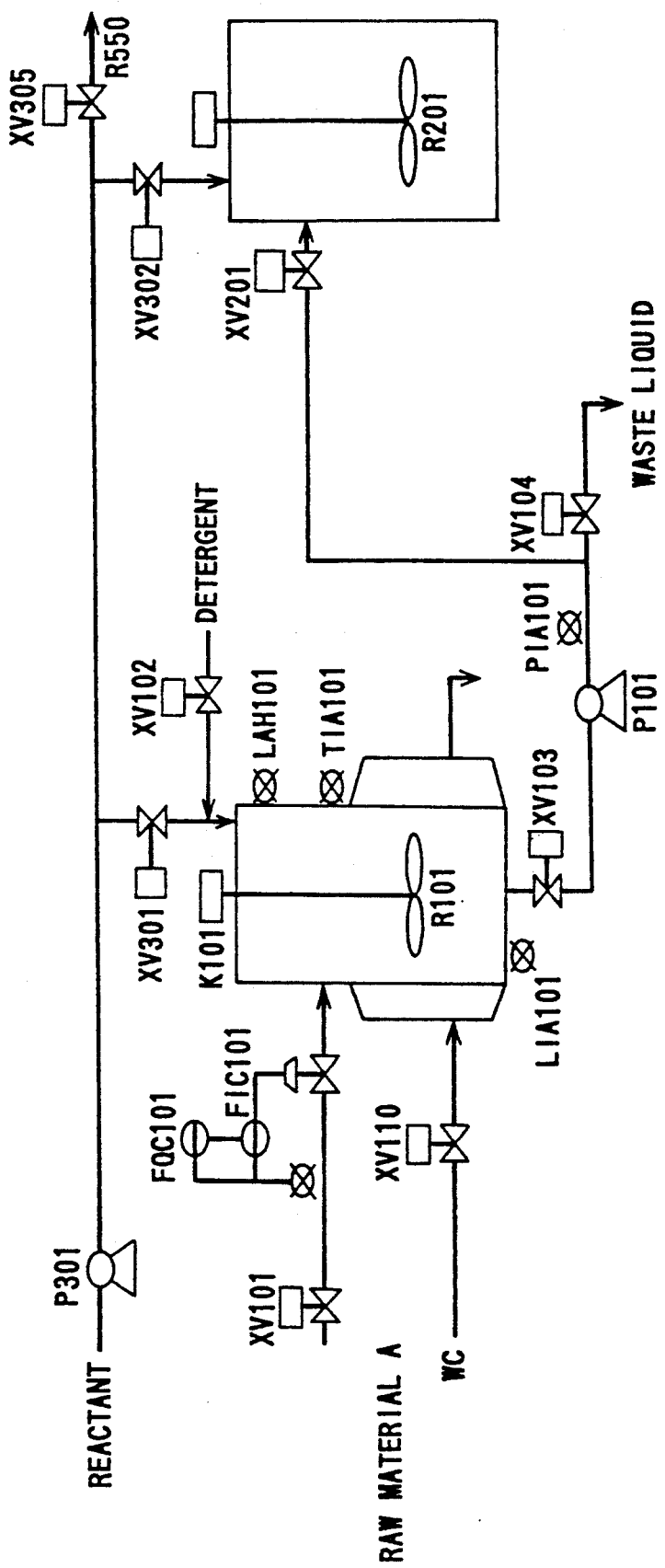
FIG. 5 is a flowchart of a process for realizing the raw material charge involved in one embodiment of this invention.

FIG. 4 is a block diagram of a device for generating a sequence including a simulator, table generating means and flow generating means according to the fourth embodiment of this invention. This device comprises a command editor (input means) 12, a macro processor 13, data base generator 14, simulator 15, a table generator (table generating means) 16, flowchart display means (flow generating means) 17, flowchart printing means, (flow generating means) 18, and a converter 19. The macro processor 13 can read from a system macro library 20 or a user macro library 21 which stores in a hard disk, etc. a plurality of steps in one module can read the steps in the unit of module. The converter 19 can convert, e.g., MS-DOS data into UNIX data. The simulator 15 is connected to display means 15a such as CRT.

A sequence command is supplied by the command editor 12 to prepare a source file. Module information is built in this source file to prepare a command file. Information necessary to prepare a table sequence can be obtained also from an apparatus database 22.

Next, one procedure according to above embodiment will be explained with reference to FIGS. 5 to 10. In the industrial process used in this example, a raw material A is charged into a reaction vessel R101 by a batch process, using a universal equipment. The execution condition (initial condition) is that solenoid valves XV102, XV103, XV301 are closed, and a mixer K101 is stopped, and when the execution condition is not met, a warning "abnormal initial condition" is given, and an operation is interrupted.

The charging operation will be explained below. First, the solenoid valve XV101 is opened to start charging material A into the reaction vessel R101, and a flow rate per unit time is set by flow rate controllers FIC101, FQC101. After five seconds, an indication of the flow rate controller FIC101 is checked, and when the flow rate is below a set amount, the charging line is judged abnormal, and the charging operation is interrupted, a warning of an abnormal charging line being given. The charging operation ends when the charged amount has reached a value set in the flow controller FQC 101. During a charging operation, when a liquid level alarm LAH 101 becomes ON, or when the upper limit alarm of a temperature alarm TIA101 becomes ON, the charging operation is interrupted, and a warning of "an abnormal level" or a warning of "an abnormal temperature" is given. When the charging operation has ended, the mixer K101 is run, and when its running state is confirmed, a message of "R101 has been charged with raw material" is given, and the charging operation finishes. At the time of an interruption or an emergency stop of a charging operation, a required treatment is made, a message of "an interruption" or "an emergency stop" being given.

FIG. 6 shows one example of command files prepared by inputting a sequence command using the command editor 12 or the macro processor 13 to show above operation. This command file includes an initial condition check unit 23, a charge start unit 24, an initial flow rate check unit 25, an abnormal initial condition unit 26, an abnormal temperature unit 27, an abnormal level unit 28, an abnormal initial flow rate unit 29, a charge interruption treatment unit 30, and an emergency stop treatment unit 31. For example, the initial condition check unit 23 checks if the solenoid valve XV102, XV103 and XV301 is open and the mixer K101 is in operation. If at least one of the solenoid valve XV102, XV103 and XV301 is open or the mixer K101 is in operation, the abnormal initial condition unit 26 works. Based on these sequence commands, a simulation, a table sequence and a flow sequence of the operational procedure of the industrial process are prepared.

Figure 7:
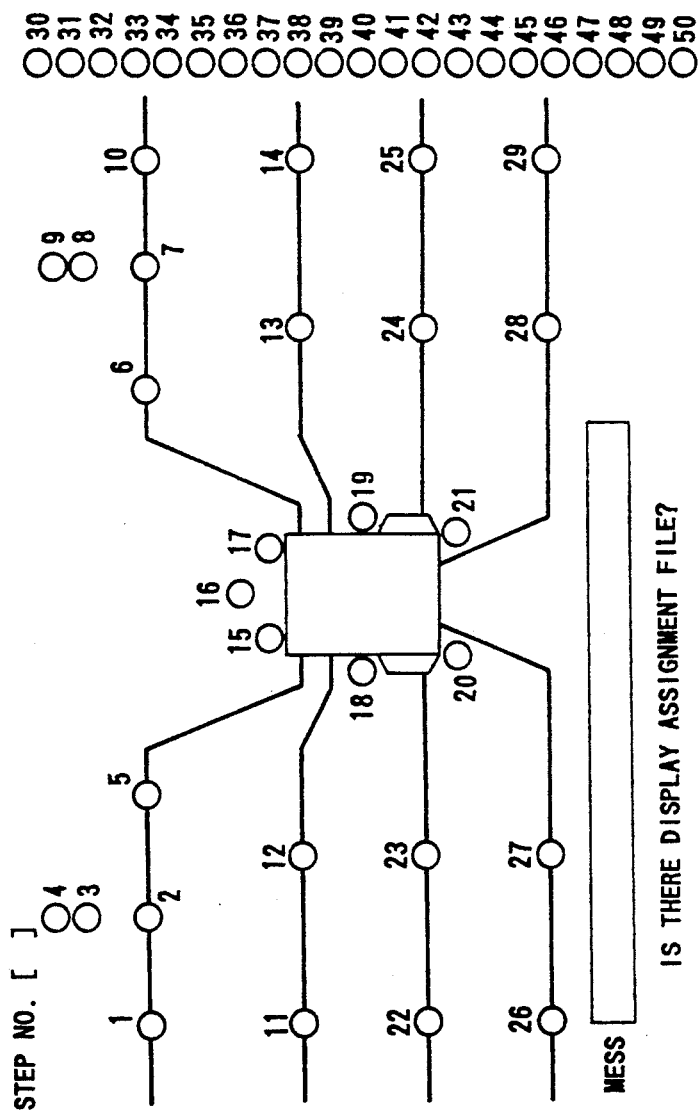
FIG. 7 is a view of one example of the standard pattern displayed on the simulator screen in FIG. 4.
Figure 8:
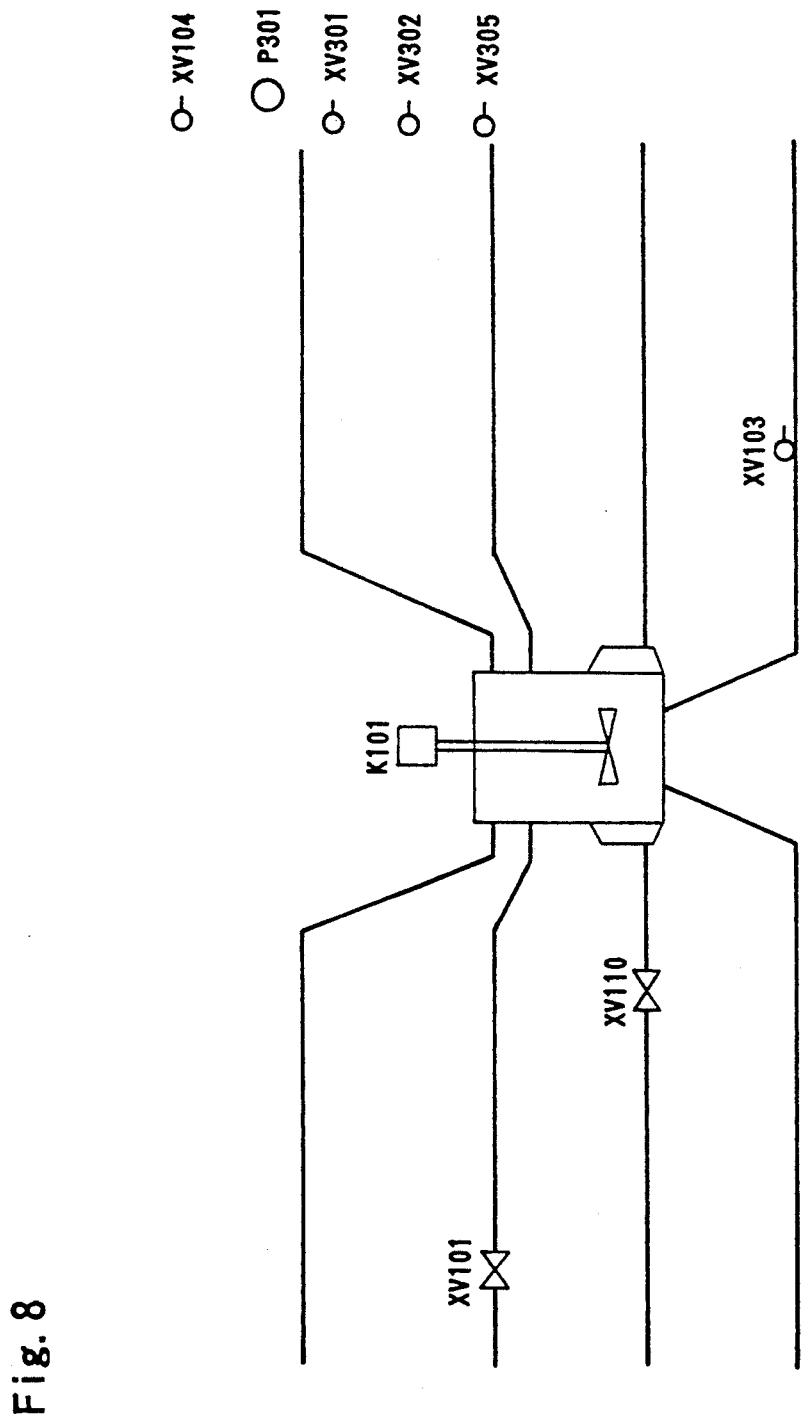
FIG. 8 is a view of a processed state of the standard pattern of FIG. 7 to a system device.
Figure 10A:
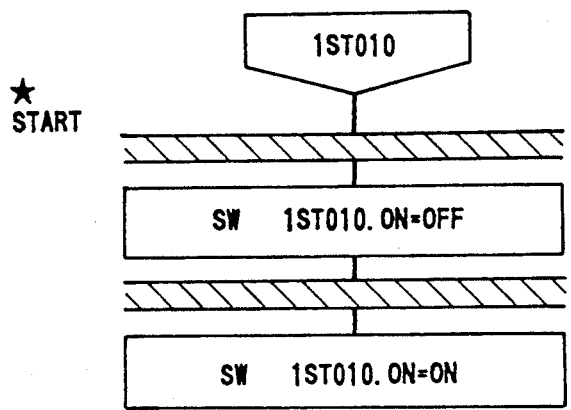
Figure 10B:
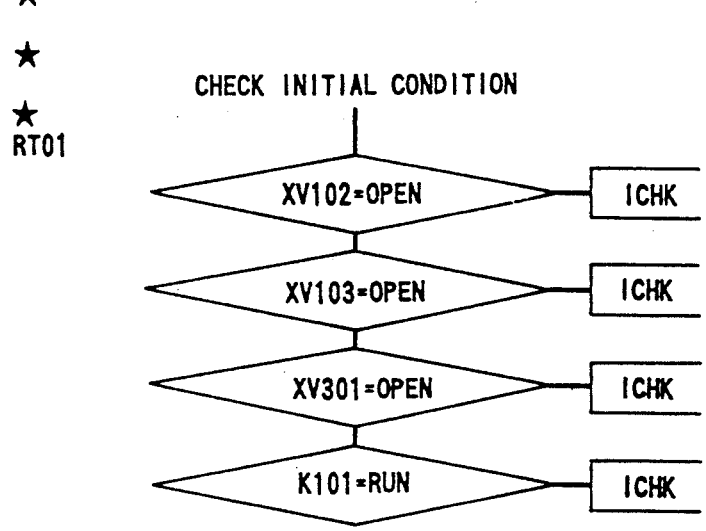
Figure 10C:
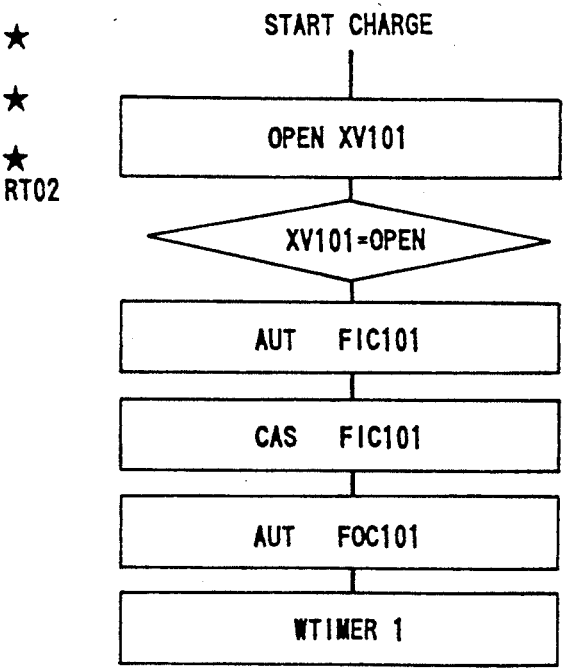
Figure 10D:
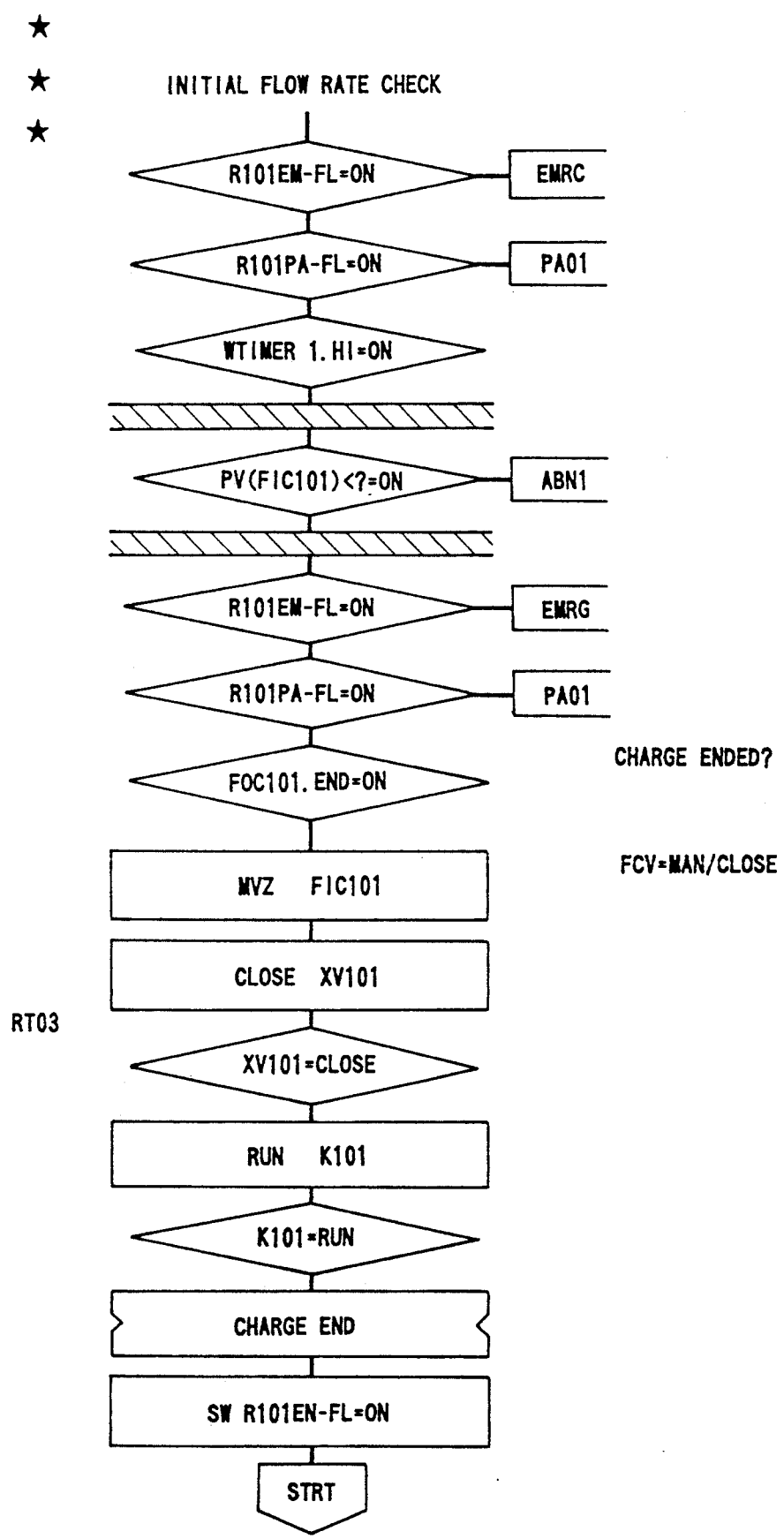
Figure 10E:
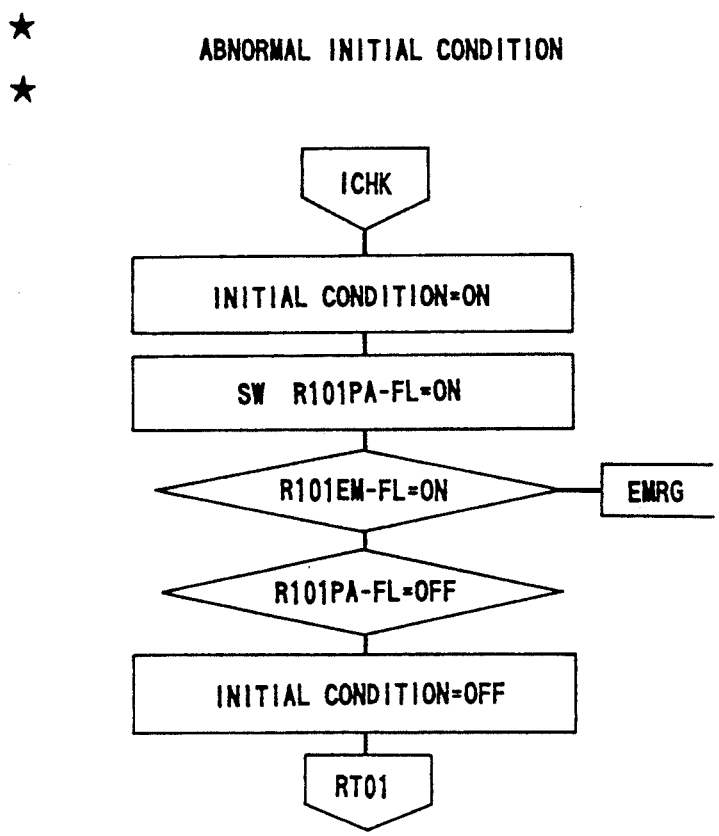
Figure 10F:
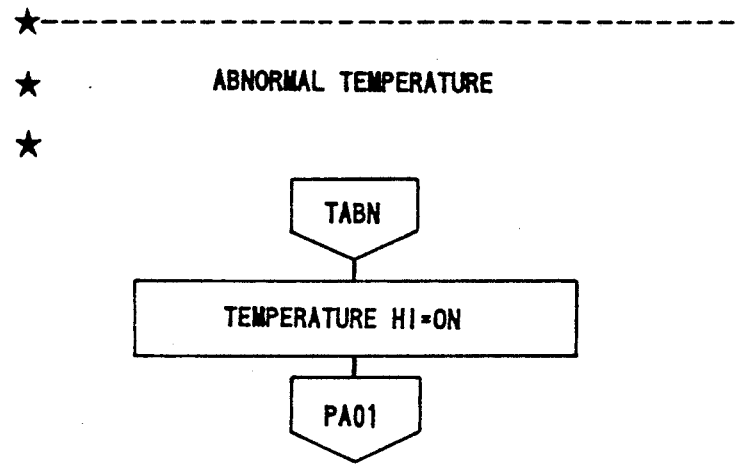
Figure 10J:
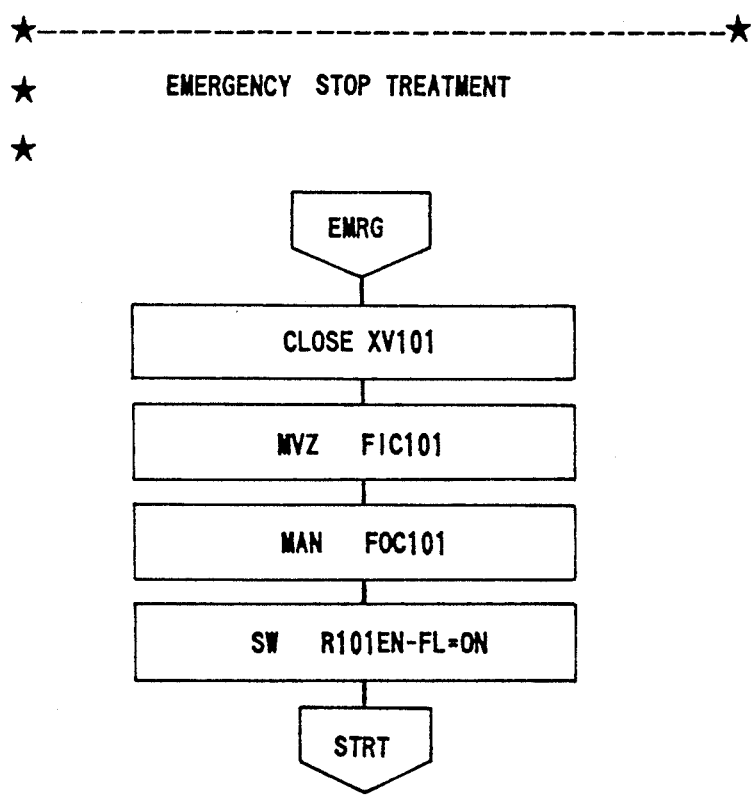

FIG. 7 shows a standard display of the display means 15a (FIG. 4). This standard display shows some necessary apparatuses used to realize the operation in symbol beforehand on a screen such as a reaction vessel, and a plurality of pipes, and the respective pipes are numbered to show their locations. That is, kinds of apparatuses (e.g., solenoid valves, pumps, and mixers) are shown numbered, so that a system device for realizing an industrial process can be displayed in symbol on the screen. FIG. 8 shows an intermediate state of making the system for realizing the operation of the process on the screen in use of the standard display. The simulator 15 simulates the operational procedure of the raw material charge process of the device based on the operation information included in the command file (sequence commands). Specifically, the process is executed step by step, e.g., the opening and closing operations of the solenoid valves are displayed by changing colors of the symbols representing the solenoid valves on the screen. Thus, according to the above-described system device displayed on the screen in symbols, the raw material charge process can be easily simulated, and errors (error, inconsistency, inconvenience, rationality, efficiency, etc. in the system) can be visually judged.

FIG. 9 shows one example of table sequence prepared by the table generator 16 (See FIG. 4). In this table sequence, the names of the apparatuses used in the raw material charge process are shown in the column, and the rule numbers (the second row) and the step numbers (the fourth row) are shown in the rows. In this table, open state of the solenoid valve is indicated by "Y" and close state thereof is indicated by "N". The upper area shows all conditions and the lower area shows actions when the conditions are met. The seventh rule (the third step), for example, shows the operational procedure that the solenoid valves XV102, XV103, XV301 are closed with the mixer K101 stopped, and the solenoid valve XV101 is opened. Specifically, when a sequence command is read from the second memory means 3 (See FIG. 2), proper characters such as letters showing an apparatus name (XV102, K101, etc.) and an operation (Y, N) corresponding to the sequence command according to step or rule are sent to the table generating means to display the table in use of software method. According to this embodiment, a table sequence showing the operational procedure of the raw material charge can be simply prepared, with a result of improved operational efficiency. In addition, it becomes easier to follow additions to and changes of the process.

FIG. 10 shows a flow sequence printed by the flowchart printing means 18 (see FIG. 4). Flow elements (boxes, decision boxes, or others) are read from a third memory means (not shown), based on a sequence command. Specifically, when a sequence command is read from the second memory means 3 (see FIG. 3), proper flow elements showing the initial condition check procedure (see FIG. 10B), the initial flow check procedure (see FIG. 10D), etc. corresponding to the sequence command are sent to the flow generating means 11 to generate a complete flow sequence in use of software method. According to this embodiment, a sequence flow showing the operational procedure of the raw material charge process can be easily prepared, and additions to and changes of the industrial process can be easily made.

This invention is not limited to the above-described embodiments. This invention is applicable to batch processes and continuous processes.

This invention, which is arranged as described above, enables a sequence generating operation for industrial processes to be performed efficiently.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A device for generating a sequence of an industrial process by combining in a required sequence a plurality of processes each realized by operating an assembly of a plurality of apparatuses in a predetermined manner, the device comprising:

first memory means for storing a sequence command including apparatus data relating to the apparatuses and operation data relating to operations of the apparatuses for preparing a command file to realize the industrial process;

first means for reading the sequence command from the first memory means;

second memory means for storing the command file containing the sequence command read from the first memory means by the first reading means to simulate the industrial process;

third memory means for storing beforehand symbols corresponding to the apparatus data of the sequence command;

second means for reading from the third memory means the symbols corresponding to the apparatus data of the sequence command in the command file stored in the second memory means;

means for displaying a schema of system for realizing the industrial process by using the symbols read by the second reading means; and a simulator for reading the operation data of the sequence command in the command file from the second memory means and simulating the operational procedure of the industrial process with the schema displayed by the display means.

2. A device for generating a sequence of an industrial process according to claim 1, wherein the display means displays the symbols corresponding to the apparatus data in set colors, and the simulator changes the colors to express the operation data corresponding to the apparatus data corresponding to the symbols.

3. A device for generating a sequence of an industrial process according to claim 1, further comprising:

fourth memory means for storing at least one of the plurality of processes as one module;

third means for reading the sequence command from the first memory means; and fourth means for reading the module from the fourth memory; and wherein the second memory means, when simulating the industrial process, stores a command file including the sequence command read from the first memory means and the module read from the fourth memory means.

4. A method for generating a sequence of an industrial process by combining in a required sequence a plurality of processes each realized by operating an assembly of a plurality of apparatuses, the method comprising:

a first step of storing in first memory means a sequence command including apparatus data relating to the apparatuses and operation data relating to operations of the apparatuses to prepare a command file to realize the industrial process;

a second step of reading the sequence command from the first memory means;

a third step of storing in second memory means the command file containing the sequence command read from the first memory means in the second step to stimulate the industrial process;

a fourth step of reading symbols stored beforehand in third memory means, corresponding to the apparatus data of the sequence command in the command file stored in the second memory means;

a fifth step of displaying a schema of a system for realizing the industrial process by using the symbols read in the fourth step; and a sixth step of reading from the second memory means the operation data of the sequence command in the command file, and simulating the operational procedure of the industrial process with the schema in accordance with the operation information.

5. A method for generating a sequence of an industrial process according to claim 4, further comprising the step of storing, in fourth memory means, at least one of the plurality of processes as a module; and wherein the third step includes, to simulate the industrial process, the steps of:

reading the module from the fourth memory means; and storing in the second memory means the module read from the fourth memory means and the sequence command read from the first memory means.

6. A device for generating a sequence of an industrial process by combining in a required sequence a plurality of processes each realized by operating an assembly of a plurality of apparatuses, the device comprising:

first memory means for storing a sequence command containing apparatus data relating to the apparatuses and operation data relating to operations of the apparatuses to prepare a command file to realize the industrial process;

first means for reading the sequence command from the first memory means;

second memory means for storing the command file including the sequence command read from the first memory means by the first reading means to simulate the industrial process;

third memory means for storing beforehand characters corresponding to the apparatus data of the sequence command;

second means for reading from the third memory means the characters corresponding to the apparatus data of the sequence command in the command file stored in the second memory means; and table generating means for generating a table sequence of an operational procedure of the industrial process in accordance with the sequence command in the command file stored in the second memory means by using the characters read by the second reading means.

7. A device for generating a sequence of an industrial process according to claim 6, further comprising:

fourth memory means for storing at least one of the plurality of processes as one module;

third means for reading the sequence command from the first memory means; and fourth means for reading the module from the fourth memory; and wherein the second memory means, when simulating the industrial process, stores a command file including the sequence command read from the first memory means and the module read from the fourth memory means.

8. A method for generating a sequence of an industrial process by combining in a required sequence a plurality of processes each realized by operating an assembly of a plurality of apparatuses, the method comprising:

a first step of storing in first memory means a sequence command including apparatus data relating to the apparatuses and operation data relating to operations of the apparatuses to prepare a command file to realize the industrial process;

a second step of reading the sequence command from the first memory means;

a third step of storing in second memory means the command file containing the sequence command read from the first memory means in the second step to simulate the industrial process;

a fourth step of reading characters, stored beforehand in the third memory means, corresponding to the apparatus data of the sequence command in the command file stored in the second memory means; and a fifth step of displaying a table sequence of the industrial process in accordance with the sequence command in the command file stored in the second memory means by using the characters read in the fourth step.

9. A method for generating a sequence of an industrial process according to claim 8, further comprising the step of storing, in fourth memory means, at least one of the plurality of processes as a module; and wherein the third step includes, to simulate the industrial process, the steps of:
reading the module from the fourth memory means; and
storing in the second memory means the module read from the fourth memory means and the sequence command read from the first memory means.

10. A device for generating a sequence of an industrial process by combining in a required sequence a plurality of processes each realized by operating an assembly of a plurality of apparatuses, the device comprising:
first memory means for storing a sequence command including apparatus data relating to the apparatuses and operation data relating to operations of the apparatuses for preparing a command file to realize the industrial process;
first means for reading the sequence command from the first memory means;
second memory means for storing the command file containing the sequence command read from the first memory means by the first reading means to simulate the industrial process;
third memory means for storing beforehand flow elements corresponding to the sequence command;
second means for reading from the third memory means the flow elements corresponding to the sequence command in the command file stored in the second memory means; and
flow generating means for generating a flow sequence of the industrial process using the flow elements read by the second reading means.

11. A device for generating a sequence of an industrial process according to claim 10, further comprising:
fourth memory means for storing at least one of the plurality of processes as one module;
third means for reading the sequence command from the first memory means; and
fourth means for reading the module from the fourth memory; and
wherein the second memory means, when simulating the industrial process, stores a command file including the sequence command read from the first memory means and the module read from the fourth memory means.

12. A method for generating a sequence of an industrial process by combining in a required sequence a plurality of processes each realized by operating an assembly of a plurality of apparatuses, the method comprising:
a first step of storing in first memory means a sequence command including apparatus data relating to the apparatuses and operation data relating to operations of the apparatuses to prepare a command file to realize the industrial process;
a second step of reading the sequence command from the first memory means;
a third step of storing in second memory means the command file containing the sequence command read from the first memory means in the second step to simulate the industrial process;
a fourth step of reading flow elements, stored beforehand in third memory means, corresponding to the sequence command in the command file stored in the second memory means; and
a fifth step of generating a flow sequence of the industrial process using the flow elements read in the fourth step.

13. A method for generating a sequence of an industrial process according to claim 12, further comprising the step of storing, in fourth memory means, at least one of the plurality of processes as a module; and
wherein the third step includes, to simulate the industrial process, the steps of:
reading the module from the fourth memory means; and
storing in the second memory means the module read from the fourth memory means and the sequence command read from the first memory means.

* * * * *